United States Patent
Ramachandran et al.

(10) Patent No.: US 10,402,180 B2
(45) Date of Patent: Sep. 3, 2019

(54) LATENCY REDUCTION IN FEEDBACK-BASED SYSTEM PERFORMANCE DETERMINATION

(71) Applicant: Google Inc., Mountain View, CA (US)

(72) Inventors: Vinod Kumar Ramachandran, Foster City, CA (US); Jing Wang, Santa Clara, CA (US); Steve Swan, Los Altos Hills, CA (US); Victor Kasatkin, Mountain View, CA (US); Fei Li, San Jose, CA (US); Zhe Liu, Sunnyvale, CA (US); Alex Valle, Daly City, CA (US); Peng Tang, San Jose, CA (US)

(73) Assignee: Google LLC, Mountain View, CA (US)

( * ) Notice: Subject to any disclaimer, the term of this patent is extended or adjusted under 35 U.S.C. 154(b) by 62 days.

(21) Appl. No.: 15/196,891

(22) Filed: Jun. 29, 2016

(65) Prior Publication Data

US 2018/0004497 A1    Jan. 4, 2018

(51) Int. Cl.
*G06F 8/60* (2018.01)
*G06F 11/34* (2006.01)
(Continued)

(52) U.S. Cl.
CPC ............ *G06F 8/60* (2013.01); *G06F 11/3438* (2013.01); *G06N 20/00* (2019.01);
(Continued)

(58) Field of Classification Search
CPC ..... G06F 8/60; G06F 11/3438; G06N 99/005; G06N 20/00; G06Q 30/0202; G06Q 30/0244; G06Q 30/0255
(Continued)

(56) References Cited

U.S. PATENT DOCUMENTS 7,287,000 B2    10/2007   Boyd et al.
8,571,930 B1    10/2013   Galperin
(Continued)

FOREIGN PATENT DOCUMENTS

WO    WO-2013/032723 A2    3/2013

OTHER PUBLICATIONS

Karlis et al, Statistics and Computing 15: 255-265, 2005, Multivariate Poisson regression with covariance structure.*
(Continued)

*Primary Examiner* — Ziaul A Chowdhury
*Assistant Examiner* — Zengpu Wei
(74) *Attorney, Agent, or Firm* — Foley & Lardner LLP (57) ABSTRACT

The present disclosure is directed to a technique to reduce latency in feedback-based system performance determination. A system receives, from an application developer device, indications of an in-application event and a first input value for an application content delivery profile. The system receives, via an interface from an application developed by an application developer and executed by a computing device remote from the data processing system and different from the application developer device, a ping indicative of an occurrence of the in-application event on the computing device. The system merges data from the ping with internal data determined by the data processing system to generate merged data. The system determines a predicted performance for the in-application event and provides an indication of the predicted performance. The system configures, responsive to the indication of the predicted performance, the application content delivery profile with a second input value.

15 Claims, 5 Drawing Sheets

(51) Int. Cl.
*G06N 20/00* (2019.01)
*G06Q 30/02* (2012.01)

(52) U.S. Cl.
CPC ..... *G06Q 30/0202* (2013.01); *G06Q 30/0244* (2013.01); *G06Q 30/0255* (2013.01)

(58) Field of Classification Search
USPC .......................................................... 717/176
See application file for complete search history.

(56) References Cited

U.S. PATENT DOCUMENTS

| | | | | |
|---|---|---|---|---|
| 9,836,377 | B1* | 12/2017 | Danielson | G06F 11/3409 |
| 2003/0050932 | A1* | 3/2003 | Pace | G06F 8/60 |
| 2006/0178918 | A1* | 8/2006 | Mikurak | G06Q 10/06 705/7.25 |
| 2006/0200253 | A1* | 9/2006 | Hoffberg | G05B 15/02 700/19 |
| 2009/0089141 | A1* | 4/2009 | Lara | G06Q 30/0244 705/14.43 |
| 2010/0169067 | A1* | 7/2010 | Basel | G06Q 30/02 703/21 |
| 2010/0179855 | A1* | 7/2010 | Chen | G06Q 10/063 705/7.31 |
| 2011/0035272 | A1* | 2/2011 | Bhatt | G06Q 30/02 705/14.42 |
| 2012/0036003 | A1* | 2/2012 | Tong | G06Q 30/0207 705/14.39 |
| 2012/0158456 | A1 | 6/2012 | Wang et al. | |
| 2013/0041590 | A1* | 2/2013 | Burich | G06F 19/3418 702/19 |
| 2013/0054548 | A1* | 2/2013 | Fosback | G06Q 30/06 707/694 |
| 2013/0159103 | A1* | 6/2013 | Foroughi | G06Q 30/0269 705/14.53 |
| 2013/0166423 | A1* | 6/2013 | Beckert | G06F 9/445 705/34 |
| 2013/0254749 | A1* | 9/2013 | Sivalingam | G06F 11/3466 717/130 |
| 2013/0325590 | A1 | 12/2013 | Shekhawat et al. | |
| 2013/0339126 | A1* | 12/2013 | Cui | G06Q 30/02 705/14.41 |
| 2014/0114746 | A1 | 4/2014 | Pani et al. | |
| 2014/0207900 | A1* | 7/2014 | Liu | G06Q 30/0246 709/216 |
| 2015/0066643 | A1* | 3/2015 | Choi | G06Q 30/0255 705/14.53 |
| 2015/0100684 | A1* | 4/2015 | Maes | G06F 11/3672 709/224 |
| 2015/0220976 | A1* | 8/2015 | Guo | G06Q 30/0273 705/14.48 |
| 2015/0310335 | A1* | 10/2015 | Fan | G06N 99/005 706/12 |
| 2015/0339572 | A1* | 11/2015 | Achin | G06N 5/02 706/46 |
| 2016/0127210 | A1 | 5/2016 | Noureddin et al. | |
| 2017/0011420 | A1* | 1/2017 | Sullivan | G06Q 30/0254 |
| 2017/0098239 | A1* | 4/2017 | Yan | G06Q 30/0275 |
| 2017/0124474 | A1* | 5/2017 | Kashyap | G06N 20/00 |
| 2017/0169465 | A1* | 6/2017 | Capel | G06Q 30/0249 |

OTHER PUBLICATIONS

Yun et al, "Optimal Aggregation Policy for Reducing Tail Latency of Web Search", [Online], 2015, pp. 63-72, [Retrieved from internet on Apr. 18, 2019], <http://delivery.acm.org/10.1145/2770000/2767708/p63-yun.pdf> (Year: 2015).*

Karlsson et al, "Applications of Feedback Control in Online Advertising", [Online], 2013, pp. 6008-6013, [Retrieved from internet on Apr. 18, 2019], <https://ieeexplore.ieee.org/stamp/stamp.jsp?tp=&arnumber=6580779> (Year: 2013).*

Venkatraman et al, "Predicting Advertising Success Beyond Traditional Measures: New Insights from Neurophysiological Methods and Market Response Modeling", [Online], 2015, pp. 436-452, [Retrieved form internet on Apr. 18, 2019], <http://researchers-sbe.unimaas.nl/neuroeconomics/wp-content/uploads/site> (Year: 2015).*

Advertising Analytics. App Annie. Accessed: Jun. 29, 2016. https://www.appannie.com/tours/advertising-analytics/?_ref=header.

Announcing Forecast Intelligence: Predicting the Future of the App Economy. App Annie. Accessed: Jun. 29, 2016. http://blog.appannie.com/forecast-intelligence-predicts-future-of-app-economy/.

App Annie Launches Advanced Segmentation to Help Marketers Succeed on Mobile. App Annie. Accessed: Jun. 29, 2016. http://blog.appannie.com/advanced-app-audience-segmentation-launch/.

Artyom Dogtiev. How to Predict When an App Will Get the Most Downloads. App Developer Magazine. Aug. 20, 2014. https://appdevelopermagazine.com/1803/2014/8/20/How-to-Predict-When-An-App-Will-Get-The-Most-Downloads/.

How can you forecast or estimate sales on the app market? Quora. Accessed: Jun. 29, 2016. https://www.quora.com/How-can-you-forecast-or-estimate-sales-on-the-app-market.

Market Data Intelligence. App Annie. Accessed: Jun. 29, 2016. https://www.appannie.com/tours/market-data-intelligence/.

Plan, Manage and Measure Success with Forecast Intelligence. App Annie. Accessed: Jun. 29, 2016. http://blog.appannie.com/plan-manage-measure-success-with-forecast-intelligence/.

Kirian Voleti: "The Ultimate Guide to Google Universal App Campaigns—WahDigital," dated Jun. 18, 2106, URL:http://www.kiranvoleti.com/the-ultimate-guide-to-google-universal-app-campaigns.

Search Report and Written Opinion for Application No. PCT/US2016/068350, dated Mar. 21, 2017.

* cited by examiner

LATENCY REDUCTION IN FEEDBACK-BASED SYSTEM PERFORMANCE DETERMINATION

BACKGROUND

A graphical environment, applications or web pages can include text, images, video, or audio information provided via an application server or web page server for display. Additional content item objects can also be provided by third parties for display on the application or the web pages together with the information provided by the entities. The content item objects can include instructions to cause installation of an application configured for execution on a computing device. Thus, a person viewing a graphical environment can access the information that is the subject of the web page, the selected third party content item objects that may or may not be related to the subject matter of the web page, and trigger the instructions embedded in the content item object to cause installation of the corresponding application. Due to the large number of available content item objects and the delay in determining performance associated with an installed application, it may be challenging to select and provide content item objects for display in the graphical environment.

SUMMARY

At least one aspect is directed to a system to reduce latency in feedback-based system performance determination. The system can include a data processing system comprising one or more processors and memory. The data processing system can receive, from an application developer device, one or more indications of an in-application event and a first input value for an application content delivery profile. The data processing system can receive, via an interface from an application developed by an application developer and executed by a computing device remote from the data processing system and different from the application developer device, a ping indicative of an occurrence of the in-application event on the computing device. The data processing system can merge data from the ping with internal data determined by the data processing system to generate a merged data set. The data processing system can determine, based on the merged data set and the first input value, a predicted performance for the in-application event. The data processing system can provide, via the interface, an indication of the predicted performance determined based on the merged data set and the first input value. The data processing system can configure, responsive to the indication of the predicted performance, the application content delivery profile with a second input value.

At least one aspect is directed to a method of reducing latency in feedback-based system performance determination. The method can include a data processing system receiving, from an application developer device, one or more indications of an in-application event and a first input value for an application content delivery profile. The method can include the data processing system receiving, via an interface from an application developed by an application developer and executed by a computing device remote from the data processing system and different from the application developer device, a ping indicative of an occurrence of the in-application event on the computing device. The method can include the data processing system merging data from the ping with internal data determined by the data processing system to generate a merged data set. The method can include the data processing system determining, based on the merged data set and the first input value, a predicted performance for the in-application event. The method can include the data processing system providing, via the interface, an indication of the predicted performance determined based on the merged data set and the first input value. The method can include the data processing system configuring, responsive to the indication of the predicted performance, the application content delivery profile with a second input value.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

The present disclosure is generally directed to reducing latency in feedback-based system performance determination. For example, when executing a content campaign for a mobile application, it may be challenging for a content provider or application developer to determine or estimate an expected performance for a content item object comprising instructions to download and install the application, or perform a specific action within the application. Predicting performance can be increasingly challenging as content item objects for the application are rendered on various web properties, applications, or networks. Furthermore, it is challenging to predict different types of events such as future application installations versus in-application events because these different events may utilize different tracking interfaces. Thus, it may be challenging for a content provider or application developer to configure a content campaign (e.g., application content delivery profile) to cause increased installations of their application due to the delay in obtaining feedback on the performance of the content campaign, application, or system.

Systems and methods of the present disclosure can reduce latency in feedback-based system performance determination. For example, a data processing system can leverage an improved tracking interface and data merging techniques along with statistical modeling techniques to provide predicted performance data based on input values.

The data processing system can provide guidance regarding input values for a content campaign comprising an application content delivery profile, such as bid and budget guidance, by providing a real-time estimate of performance. For example, a content provider can leverage an estimate of application installations determined by the data processing system or volume and revenue of in-application events selected by the content provider. The data processing system can provide this estimate via a graphical user interface, and further update the estimate in real-time while the content provider creates or modifies their content campaign. The projected estimates can adapt to a variety of inputs. For example, inputs can include, but are not limited to, bids (willingness to pay for an application installation), budgets (daily or total spend limit), select countries (geographic location of computing devices that render the ad), languages (of the device settings which will render the ad), or type of content item (e.g., whether the content provider is promoting a specific video, image). By allowing various inputs and surfacing projections in real-time, the data processing system allows content providers to make media buying decisions in real-time, and understand the tradeoffs of their various choices.

To generate these projections, the data processing system can use machine learning and multivariable regression techniques. The data processing system can use a combination of data internal the data processing system and data provided by an application developer or content provider. The internal data can include, for example, data related to organic application impressions (e.g., impressions not in response to an ad), clicks, selections, installations, or spend, as well as ad logs of impressions, clicks, or conversions. Data provided by a content provider or application developer can include, for example, a variety of in-application events and values for those in-application events. The data processing system can use a model that combines or merges the internal data and the data provided by the content provider to predict performance for new and existing applications.

For example, for existing applications, the data processing system can use both the content history and interactions associated with that application to predict the likelihood that other (similar) computing devices install that application or complete the in-application action. The data processing system can determine, based on logged content history, computing devices or computing device profiles that are likely to click, install and engage with content item objects for the application.

For content providers of new applications that have previously listed their application in an online marketplace, the data processing system can leverage organic data to predict which computing devices are likely to click on a listing for the application, likely to install the application, and likely to engage with or otherwise perform an actions via the application.

For applications that are new to the online marketplace that have not previously listed in an application in the online marketplace, the data processing system can determine a characteristic of the application to identify similar applications, and use information about a category, geography, and language of the identified similar applications to determine a likely performance.

Thus, the data processing system provides a robust, real-time, accurate interface that can combine organic internal data and data from pings from the application and uses a machine learning technique to predict performance of application installations or an in-application event based on one or more input values. Input values can include, for example, assigning an in-application event a certain value (e.g., booking a flight from New York City to Paris can have a value of $500 value for a flight), or the in-application event can be assigned different values or a range value for each computing device, or instance of the action. The data processing system can tailor the predictions to the specific content provider, application, settings, and goals in real-time and reduce the delay in feedback-based system performance. The data processing system can provide tradeoffs in real-time and change settings to optimize content delivery. The data processing system can link input to expected output for mobile application install ads or re-engagement ads.

For example, the data processing system can obtain historical data for content item objects that are configured to cause an application to be downloaded or installed on a computing device (e.g., an ad with a link to the application on an online marketplace). The historical data can include one or more signals, such as impression (e.g., the content item object rendered on a computing device), click (e.g., a user of the computing device selecting the content item object rendered on the computing device), installation (e.g., the user of the computing device instructing the computing device to download and install the application on the computing device), or conversion (e.g., a user performing a desired in-application event via the installed application executing on the computing device). The data processing system can attribute the installation of the application (or in-application action) to the rendering of the content item data object on the computing device. For example, the data processing system can correlate time stamps associated with the content item impression and installation, device identifiers, profile information, location identifiers, language identifiers, application category information, publisher information, developer information, tags, or other indications or identifiers.

The data processing system can aggregate or merge the signals across all users of the same application to create a first merged data set. The data processing system can aggregate or merge signals across all applications that are similar to the application (e.g., all travel applications) that were downloaded via one or more content item objects to create a second merged data set. The data processing system can aggregate or merge the signals across all similar applications that were organically downloaded (e.g., were not installed responsive to a content item object or ad) to create a third merged data set. In some cases, the data processing system can merge the first, second and third data sets.

Signals can include internal signals determined by the data processing system or signals provided by an interface of the application executing on the computing device. Internal signals can include, for example, type of application, whether the application is installed, a configuration of the application, or whether payments have been made or payment information is linked to the application. Signals provided by the application can include, for example, application statistics, state of the application, levels achieved in the applications, scores achieved in the application, queries input into the applications, or transactions conducted via the application. The application developer can configure the in-application events to provide signals to the data processing system. The data processing system can store the data in a data structure such as {content_item_ID, event_ID}.

The data processing system can be configured with a machine learning technique that takes as input the signals to predict which of the signals are correlated to a desired event, such as conducting a transaction. The data processing system can determine a score for each signal. The data processing system can map the scored signals to computing devices in real-time. For example, the data processing system can identify computing devices that match the highest scoring signals to determine a number of computing devices having the highest scoring signals. Based on the highest scoring signals, the data processing system can predict a likelihood of whether the desired event (e.g., application installation or in-application event) will occur for the computing device. Based on the number of computing devices having the highest scoring signals, the data processing system can determine a performance of the content campaign or application. The data processing system can provide the predicted performance to a content provider or application developer in real-time.

Figure 1:
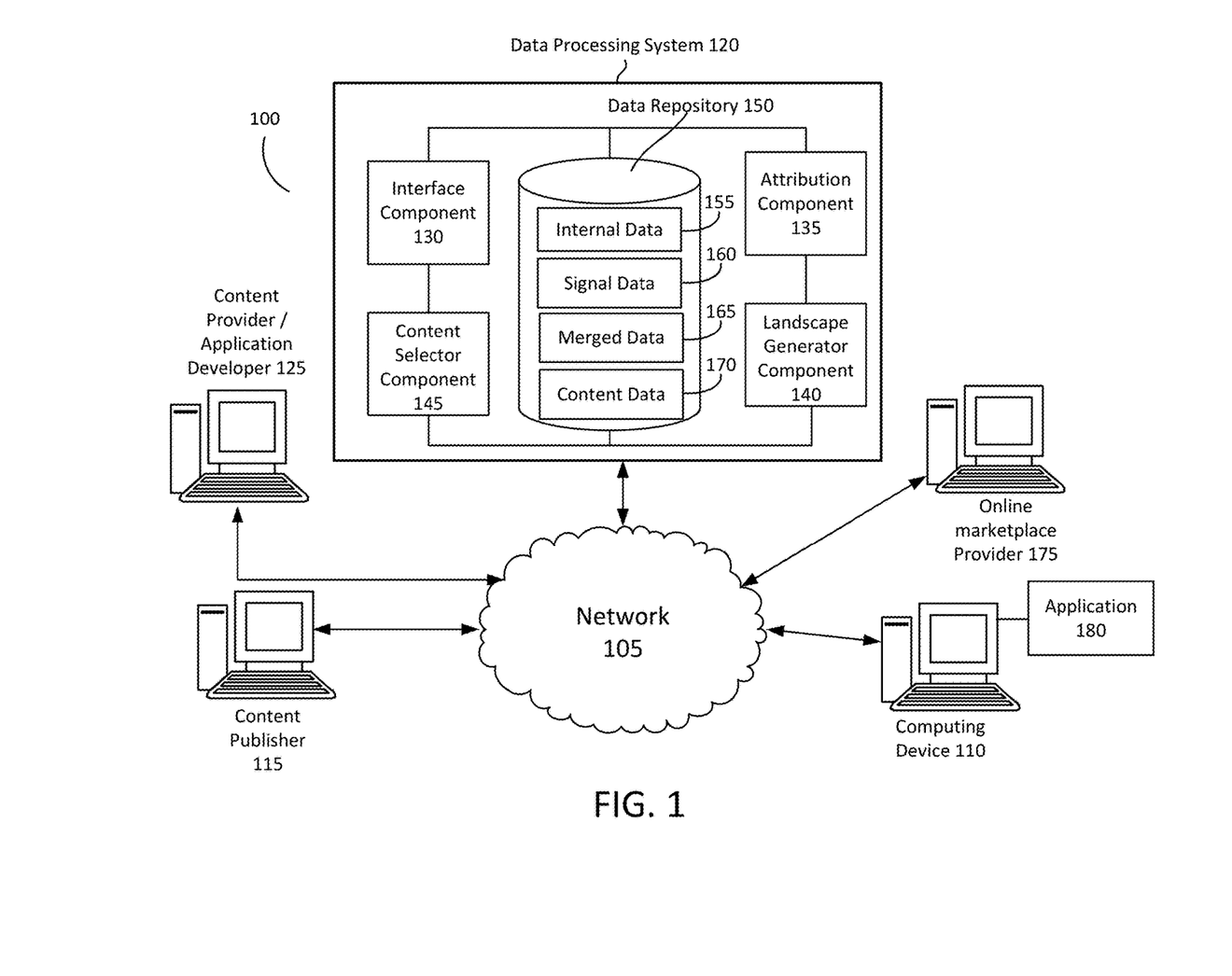
FIG. 1 is an illustration of a system to reduce latency in feedback-based system performance determination in accordance with an implementation.

FIG. 1 illustrates an example system 100 to reduce latency in feedback-based system performance determination accordance with an implementation. The system 100 can include content selection infrastructure. The system 100 can include a data processing system 120 communicating with one or more of a content provider computing device 125, application developer device 125, content publisher computing device 115, online marketplace provider 175, or client computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as mobile applications, web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access mobile applications or web pages provided by at least one web site operator or content publisher 115 or application developer 125. A web browser of the computing device 110 can access a web server of the web site operator or content publisher 115 to retrieve a web page for display on a monitor of the computing device 110. The content publisher 115 can provide instructions to the application executing on the computing device 110 to render the content. The application developer 125 or web site operator or content publisher 115 generally includes an entity that operates the mobile application or web page. The application developer 125 or web site operator or content publisher 115 includes at least one web page server that communicates with the network 105 to make the web page available to the computing device 110. The data processing system 120 can provide instructions to the application executing on the computing device 110 to render content. The computing device 110 can access the online marketplace provided by the online marketplace provider 175 via network 105. The computing device 110 can download an application 180 via the online marketplace via network 105.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the application developer 125 or web site operator or content publisher computing device 115 (or content publisher 115), and at least one content provider computing device 125 (or provider device 125 or content provider 125 or application developer 125). The data processing system 120 can include at least one computation resource, server, processor or memory. For example, the data processing system 120 can include a plurality of computation resources or servers located in at least one data center. The data processing system 120 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one computation resource or server. The data processing system 120 can include at least one interface component 130, at least one attribution component 135, at least one landscape generator component 140, at least one content selector component 145, and at least one data repository 150. The at least one data repository 150 can include or store, in one or more data structures or databases, internal data 155 corresponding to one or more applications, signal data 160, merged data 165, or content data 170. The internal data 155 can include data determined by the data processing system associated with the application, such as a type of application, configuration of the application, geographic location of a computing device when the application or content item is provided, or language associated with the application or computing device. The signal data 160 can include in-application events such as performing an electronic transaction via the application, a game level or score of the application, or queries input into the application. Merged data 165 can include merging internal data 155 and signal data 160 for an application or category of applications. Content data 170 can include, for example, content campaign information, content groups, content selection criteria, content item objects or other information provided by a content provider 125 or obtained or determined by the data processing system to facilitate content selection. The interface component 130, attribution component 135, landscape generator component 140, and content selector component 145 can each include at least one processing unit or other logic device such as programmable logic array engine, or module configured to communicate with the database repository or database 150. The interface component 130, attribution component 135, landscape generator component 140, and content selector component 145, and data repository 150 can be separate components, a single component, or part of the data processing system 120. The system 100 and its components, such as a data processing system 120, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can include an interface component 130 designed, configured, constructed, or operational to receive data from an application executed on a computing device or provide a graphical user interface to a content provider 125. The interface component 130 can execute on one or more processors or computation resources of the data processing system 120 to receive data and provide information. The interface 130 can provide one or more widgets to receive input data, such as input values associated with a content campaign.

A content provider 125 may establish an electronic content campaign. An electronic content campaign can refer to one or more content groups that correspond to a common theme. A content campaign can include a hierarchical data structure that includes content groups, content item data objects, and content selection criteria. To create a content campaign, content provider 125 can specify values for campaign level parameters of the content campaign. The campaign level parameters can include, for example, a campaign name, a preferred content network for placing content item objects, a budget for the content campaign, a bid amount for content item objects, start and end dates for the content campaign, a duration for the content campaign, a schedule for content item object placements, language, geographical locations, type of computing devices on which to provide content item objects. Other campaign level parameters can include, for example, a payment technique such as a cost-per-click (CPC), cost per thousand impressions (CPM), cost-per-action (CPA), cost-per-conversion, or cost per thousand conversions. In some cases, an impression can refer to when a content item object is fetched from its source (e.g., data processing system 120 or content provider 125), and is countable. In some cases, due to the possibility of click fraud, robotic activity can be filtered and excluded, as an impression. Thus, in some cases, an impression can refer to a measurement of responses from a Web server to a page request from a browser executed on the computing device 110, which is filtered from robotic activity and error codes, and is recorded at a point as close as possible to opportunity to render the content item object for display on the computing device 110. In some cases, an impression can refer to a viewable impression; e.g., the content item object is at least partially (e.g., 20%, 30%, 30%, 40%, 50%, 60%, 70%, or more) viewable on a display device of the client computing device 110. A click or selection can refer to a user interaction with the content item object, such as a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider 125 can further establish one or more content groups for a content campaign. A content group includes one or more content item objects and corresponding content selection criteria, such as keywords, words, terms, phrases, geographic locations, type of computing device, mobile app category, publisher site, time of day, interest, topic, or vertical. Content groups under the same content campaign can share the same campaign level parameters, but may have tailored specifications for particular content group level parameters, such as keywords, negative keywords (e.g., that block placement of the content item in the presence of the negative keyword on main content), bids for keywords, or budget, geographies, languages, mobile app categories, audiences, and publisher placements.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 125 can use to capture a topic or subject matter for which content item objects of the content group is to be selected for display. For example, a developer of travel applications can create a different content group for each type of travel application or application feature it develops. Examples of the content group themes that the travel application developer can use include, for example, "Flights", "Hotels", "Trains", "Rental Cars", "Cheap flights", or "Beach Vacation", "All-inclusive Resort Packages". An example content campaign theme can be "beach vacation" and include content groups for both "flights" and "hotels", for example.

The application developer 125 or content provider 125 can provide overall objectives or one or more keywords and content item objects to each content group. Objectives can include "optimize volume of these specific in-app events" or "optimize profit among these specific in-app events". Keywords can include terms that are relevant to the product or services of associated with or identified by the content item objects. A keyword can include one or more terms or phrases. For example, the travel application developer may include "beach," "resort," "family," "tropical," as keywords for a content group or content campaign. In some cases, negative keywords can be specified by the content provider to avoid, prevent, block, or disable content placement on certain search result webpages or content webpages matching those negative keywords. The content provider can specify a type of matching, such as exact match, phrase match, or broad match, used to select content item objects.

The content provider 125 can provide one or more content item objects for selection by the data processing system 120. The data processing system 120 (e.g., via content selector component 145) can select the content item objects when a content placement opportunity becomes available that matches the budget, content schedule, maximum bids, keywords, and other selection criteria specified for the content group. Different types of content item objects can be included in a content group, such as a text content item, an image content item, video content item, audio content item, multimedia content item, call content item, or content item link. The content item object can include a link or instruction that causes the computing device to download, install or access the application of the application developer 125. For example, the content item object can include a link to an online marketplace provider 175. The link can cause the computing device to access the application via the online marketplace 175, and download the application.

The data processing system 120 can include a content selector component 145 designed, constructed, configured or operational to select content item objects. For example, to select content items for display in a textual environment, the data processing system 120 can parse the text to identify keywords, and use the keywords to select a matching content item based on a broad match, exact match, or phrase match. For example, the content selector component 145 can analyze, parse, or otherwise process subject matter of candidate content items to determine whether the subject matter of the candidate content items correspond to the subject matter of the textual information resource. The content selector component 145 may identify, analyze, or recognize terms, characters, text, symbols, or images of the candidate content items using an image processing technique, character recognition technique, or database lookup. The candidate content items may include metadata indicative of the subject matter of the candidate content items, in which case the content selector component 145 may process the metadata to determine whether the subject matter of the candidate content item corresponds to the web page or search query.

Content providers 125 may provide additional indicators when setting up a content campaign that includes content items. The content provider may provide information at the content campaign or content group level that the content selector component 145 may identify by performing a lookup using information about the candidate content item. For example, the candidate content item may include a unique identifier, which may map to a content group, content campaign, or content provider. The content selector component 145 may determine, based on information stored in content campaign data structure in data repository 150, information about the content provider 125.

The data processing system 120 can receive, via a computer network, a request for content for presentation on a computing device 110. The request can include selection criteria of the request, such as the device type, location, and a keyword associated with the request. The keyword can be associated with the webpage on which the content is to be displayed, a search query input by the user of the computing device, or other information associated with the request or the computing device.

Responsive to the request, the data processing system 120 can select a content item object from data repository 150 and provide the content item for rendering on the computing device 110 via network 105. The computing device 110 can interact with the content item object. The computing device 110 can select a hyperlink or other button in the content item object that causes or allows the computing device 110 to identify an application, download the application, and install the application on the computing device 110.

The data processing system can include an attribution component 135 designed, constructed and configured and operational to attribute an application installation or in-application event to a content item impression. The attribution component 135 can interact or communicate with the content selector component 145 to identify a content item impression 145 that corresponds to the computing device 110 on which application 180 is installed. For example, when the content selector component 145 provides the content item for display on the computing device 110, the content selector component 145 can store an impression log or content data 170. The content data 170 can include a record of the impression, such as an identifier of the content item, identifier associated with the computing device, timestamp for the impression, geographic location of the computing device at the time of the impression. The attribution component 135 can further identify the computing device that downloaded and installed the application (or otherwise accessed the application). For example, the data processing system 120 can include the online marketplace and provide the application to the computing device 110. If the data processing system 120 provided both the content item and the application, the data processing system 120 can use the same identifier for the computing device 110 or the data processing system 120 can maintain an index or hash function that maps a first identifier of the computing device used to provide the content item to a second identifier of the computing device used to provide the application.

In some cases, the data processing system 120 can receive the application installation information from the online marketplace provider 175 or from the application developer 125. When the data processing system 120 receive the application installation information from another entity (e.g., the application developer 125 or the online marketplace provider 175), the data processing system 120 can correlate the installation with the content item. For example, the application installation information can include a time stamp for the request to install the application, metadata associated with the request to install the application (e.g., source of the request to install, which can include a content item object or organic search for the application), geographic location of the computing device at the time of the request, or language. The data processing system 120 can use the time stamp of the request to download the application to identify content item impressions for the application that occurred within a predetermined time window of the request (e.g., within 1 minute, 5 minutes, 30 minutes, 1 hour, 2 hours or more). In the event the data processing system 120 identifies multiple content item impressions, the data processing system can further filter the content item impressions based on geographic location of the computing device 110 at the time of the content item impression and request to download the application, and language to identify the content item impression that corresponds to the application download. In some cases, the data processing system 120 can map the identifier of the computing device to a common identification scheme, or a common identifier can be used by both the data processing system 120 for content selection and application delivery.

Upon attributing the content item impression to the application download, the attribution component 135 can establish a computing device identifier mapping. Thus, as subsequent in-application information is received from the computing device 110 for the application 180, the data processing system 120 can attribute the information to the same content item impression in a data structure as follows: {application_ID, impression_ID, application_event_ID}.

The data processing system 120 can include a landscape generator component 140 designed and constructed to receive signals and input values and predict performances based on the received signals and input values. The landscape generator component 140 can predict performance for an application. Performance can refer to a number of installations of the application attributed to a content item object for the application being rendered on computing devices 110. Performance can refer to a desired in-application event that may or may not be attributed to the content item object.

The landscape generator component 140 can predict a number of installations for the application. The number of installations can refer to the number of different computing devices 110 that download the application and install the application. In some cases, the landscape generator component 140 can predict a number of downloads of the application and a number of installations of the application, where the number of downloads may be different from the number of installations. The number of downloads may be greater than the number of installations if some of the computing devices 110 that downloaded the application did not install the application, or were prevented from installing the application or were unable to install the application. For example, a computing device 110 may receive an error when attempting to install the application if the computing device 110 is not properly configured to install the application or the user installing the application lacks the requisite authority to install the application or the computing device 110 loses internet or wireless connectivity during the installation process or before the installation process can begin. In some cases, the number of installations may be greater than the number of downloads. For example, a single computing device may download the application from the data processing system 120 or online marketplace 175, and may then share the downloaded file with other computing device 110 so the other computing devices 110 can install the application without having to download the application from the data processing system 120 or online marketplace 175.

The data processing system 120 can receive information used to predict performance of a content campaign for an application. The content provider 125 can provide the data processing system 120 with an indication of a type of event. The data processing system 120 can then predict a number of occurrences of the event. For example, the data processing system 120 can receive an indication of the following types of events to optimize: application downloads, application installations, application setup, or an in-application event. The content provider 125 or application developer 125 can provide the indication of this type of event during setup of the content campaign, or management of the content campaign.

The data processing system 120 can receive one or more input values. The input value can include a tuning parameter used by the content selector component 145 to select content items of the content provider 125 for rendering on computing devices 110. The tuning parameter can be used in an online auction. The online auction can include a real-time auction. Real-time auction can refer to an auction that runs after the data processing system 120 receives a request for content for the computing device 110. The data processing system 120 can use the real-time auction to identify one or more candidate content items. The data processing system 120 can select a candidate content item based on one or more scores generated in the auction, such as a relevancy score, ad score, quality score, or bid amount. For example, the data processing system 120 can combine the bid amount with a quality score to generate an ad score, and select the content item object corresponding to the highest ad score. Thus, the content provider 125 can increase or decrease the bid amount to increase or decrease the number of times the content item object of the content provider 125 is selected based on the results of the online auction.

The data processing system 120 can receive input values such as a bid amount, a max bid amount, min bid amount, budget, or return on investment for the content campaign. The data processing system 120 can use the one or more input values to determine a performance. For example, if the bid amount is $2 and the budget is $100 per day, the data processing system can determine that the content item objects of the content campaign might be selected 50 times before the budget runs out. The content provider 125 may choose to increase the budget or lower the max bid amount to increase the number of impressions.

To further predict performance, the data processing system 120 can receive additional information. The data processing system 120 can receive the information from a component of the data processing system 120, online marketplace 175, or computing device 110. The data processing system 120 can obtain internal data obtained or determined by the data processing system 120. Internal data can refer to or include data directly determined by the data processing system 120, or data that the data processing system 120 can access, or data stored in data repository 150. For example, internal data can include a type of application provided by the data processing system 120 to the computing device 110, language of the application, geographic location of the computing device 110 as determined by the data processing system using received location information, a configuration of the application (e.g., has the application been linked with a financial institution to facilitate a financial transaction) or information associated with the content impression.

The data processing system 120 can receive data via signals or pings from an application executed on computing devices 110. The data processing system 120 can receive the signals via an interface from an application developed by the application developer 125. The data processing system 120 can receive the information from a computing device 110 executing the application 180, where the computing device 110 is remote from the data processing system 120 (e.g., communicates via network 105 with data processing system 120). For example, the data processing system 120 can receive a ping indicative of an occurrence of the in-application event on the computing device. The in-application event can refer to a desired action occurring via the application, a query, a level or score if the application is a type of game, a transaction or other action or event configured by the application developer 125 to trigger a ping. The event can be associated with a value; for example, booking a flight to Paris can correspond to a value of $300, whereas booking a rental car via the application can correspond to a value of $50.

The data processing system 120 can provide a software development kit to the application developer 125. The application developer 125 can use the software development kit to configure the application to transmit pings for predetermined in-application events responsive to a trigger or occurrence of the event. For example, the application 180 can transmit a ping responsive to a user inputting a query for "flights to Paris". The application 180 can be configured to parse the query input into the application 180 (e.g., via an input text box, audio input, keyboard, mouse), identify that the query or terms thereof match a desired query, and transmit a ping indicating an occurrence of the in-application event identifier corresponding to the query.

The data processing system 120 can merge the internal data with the data from the pings to generate a merged data set. For example, the internal data and ping data can include several signals. The data processing system 120 can attribute the signals to a content item impression identifier or computing device 110 identifier. The data processing system 120 can merge the internal data and ping data into a data structure that relates to a common content impression identifier or computing device 110 identifier.

In some cases, the data processing system 120 receives multiple pings from multiple applications executed by one or more computing devices. The data processing system 120 can categorize the pings based on the type of applications or other characteristic related to the applications. For example, the data processing system 120 can categorize the applications into the following categories: entertainment, news, travel, games, productivity, utility, music, or video. The data processing system 120 may further categorize or group applications based on other characteristics, such as language, geography, or operating system. The data processing system 120 can use the categories to identify similar applications.

The data processing system 120 can merge data from the multiple pings with internal data determined by the data processing system to generate the merged data. The data processing system 120 can merge the multiple pings even though they may be for different applications because the data processing system 120 can determine that the different applications are similar based on being in a same category or having one or more characteristics in common.

The data processing system 120 can determine, based on the merged data set and the first input value, a predicted performance for the in-application event or a number of installations of the application. The data processing system 120 can determine the predicted performance based on a machine learning technique. The machine learning technique can include, e.g., a regression model, a multivariate Poisson regression model, or a multivariate Poisson regression model with regularizations.

The data processing system 120 can use the machine learning technique to predict which of the signals in the merged data are correlated to a desired event, such as an in-application event or application installation. The data processing system 120 can use the machine learning technique to output a score for each of the signals or a combination of signals. The data processing system 120 can rank the signals or combination of signals based on their scores to identify the top ranking signals or combination of signals. For example, a top ranking signal for a travel application where the desired event is purchasing a flight ticket to Paris can be inputting a search query with terms "flights to Paris" or "flights to Paris this weekend" or "visit Eiffel Tower" or "tourist attractions in Europe".

The data processing system 120 can identify additional signals that indicate a likelihood of occurrence of the desired event. For example, the data processing system 120 can determine, using the machine learning technique, that a signal corresponding to configuring the travel application card with a financial account (e.g., a credit card number, checking account, or other financial instrument) indicates a higher likelihood of the user purchasing a flight to Paris, as compared to travel applications that are not configured with a financial account. Similarly, the data processing system 120 can determine that a user who previously purchased goods in a gaming application is likely to purchase goods in gaming applications in the future.

The data processing system 120 can predict the performance of a content campaign for an application based on an input value using the merged data. In some cases, the data processing system 120 can predict the performance of the content campaign for the application without using ping data from the application. For example, the data processing system 120 can identify other applications that are similar to the application for which the content campaign is being setup or managed, and predict the performance of the application using ping data associated with the similar applications. Thus, the data processing system 120 can generate the merged data with one or more of internal data, ping data of the application, or ping data of similar applications.

The data processing system 120 can use the machine learning technique to generate scores for signals in the merged data. In some cases, the data processing system 120 can use a Poisson regression with regularizations. A Poisson regression can refer to a regression analysis that models count data and contingency tables. When using the Poisson regression, the data processing system can determine that a response variable Y (e.g., a desired application event) has a Poisson distribution, and further determine that a logarithm of its expected value can be modeled by a linear combination of unknown parameters (e.g., signals of the merged data). In some cases, the data processing system 120 can use a negative binomial regression, which generalizes the Poisson regression.

In the Poisson regression, the dependent variable can be a count, such as a number of application events. The events can be independent since the occurrence of one event on one computing device 110 is independent (e.g., does not make it more or less likely) from the occurrence of the event on another computing device 110.

In some cases, the data processing system 120 can use a regularized Poisson regression to identify a value for θ that maximizes the likelihood of an expression of the form:

$$\sum_{i=1}^{m} \log(p(y_i; e^{\theta'x})),$$

where m is the number of examples in the merged data set, and $p(y_i; e^{\theta'x})$ is the probability mass function of the Poisson distribution with the mean set to $e^{\theta'x}$. Regularization can be added to this optimization problem by maximizing:

$$\sum_{i=1}^{m} \log(p(y_i; e^{\theta'x})) - \lambda \|\theta\|_2^2,$$

for some positive constant $\lambda$.

Upon identifying the signals correlated with the desired event, the data processing system 120 can identify a number of computing devices 120 in real-time that are associated with the top ranking signals. For example, the data processing system 120 can determine that the top ranking signals for purchasing a flight to Paris are: search query for "flight to Paris" in application; application configured with credit card; application language is French; and the location of computing device executing application is Montreal, Canada. The data processing system 120 can identify, in real-time, the number of computing devices 110 that are associated with these signals. For example, the data processing system 120 can determine, based on ping data received from the computing devices 110 and internal data stored in the data processing system 120 related to these computing devices 110 that there are 1,000 computing devices 110 matching these signals.

In some cases, the data processing system 120 can calibrate the predicted performance based on a second predicted performance of a plurality of applications to determine the predicted performance. The plurality of applications can be similar to the application based on being in the same category (e.g., travel applications), language, operating system, or geography. The data processing system 120 can use a merged data set to predict the performance. The data processing system 120 can adjust the initial predicted performance based on a predicted performance using the similar applications. For example, there may be more historical data available for the similar applications if the application is a new application or relatively new application. Thus, the data processing system 120 can use the additional historical ping data received for similar application to generate an improved or more accurate predicted performance, and provide the improved predicted performance to the content provider 125.

The data processing system 120 can thus facilitate providing content items for the content provider 125 for rendering on computing devices 110 having one or more of the top ranking signals. The content provider 125 can adjust an input value, such as a bid amount or budget, and provide an indication to deliver the content items to computing devices having the one or more top ranking signals. The data processing system 120 can provide an estimate or prediction of a number of application installs or in-application events that might result from the input value. The content provider 125 may determine to adjust the input value to increase or decrease the predicted number of application installations or in-application events. For example, the content provider 125 may determine that there are only 50 flights left from Montreal to Paris this week, so the content provider 125 may choose to reduce the budget in order to reduce the number of impressions because the content provider 125 may not have sufficient inventory of flights. In some cases, the content provider 125 can choose to increase the budget or the bid amount if the predicted performance is below a threshold (e.g., predicted number of in-application events is less than the current inventory). In some cases, the predicted performance can be what the content provider 125 desires, the content provider may not change the input value. The data processing system 120 can configure, responsive to the indication of the predicted performance, the application content delivery profile of the content campaign for the application with the same or adjusted input value (e.g., increase or decrease the bid amount or budget).

Figure 2:
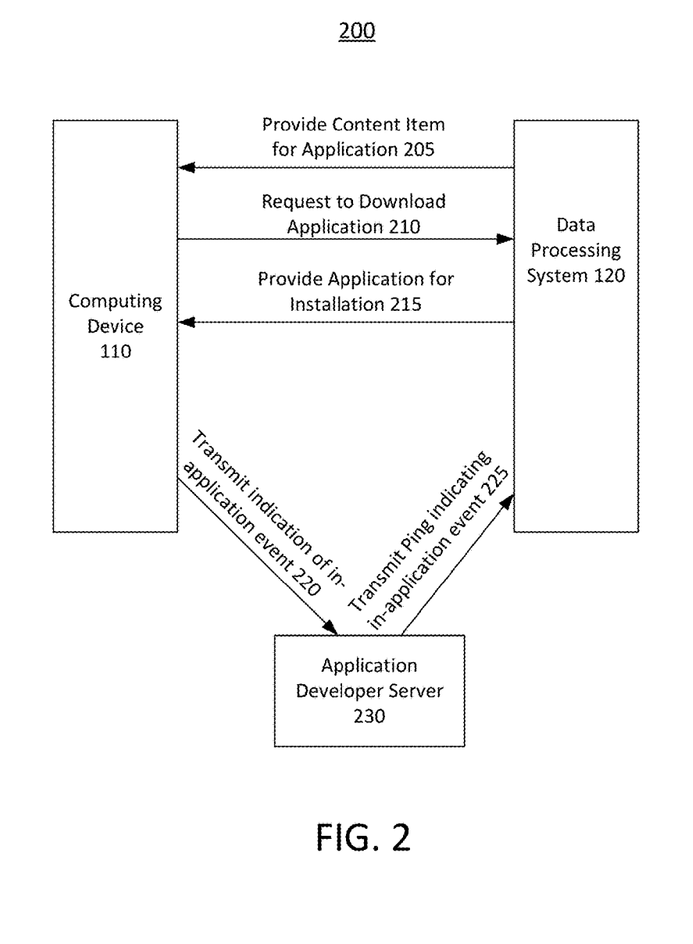
FIG. 2 is a flow diagram illustrating operation of a system to reduce latency in feedback-based system performance determination in accordance with an implementation.

FIG. 2 is a flow diagram 200 illustrating operation of a system to reduce latency in feedback-based system performance determination in accordance with an implementation. The system can include one or more component of system 100, including, for example, computing device 110, data processing system 120, and application developer server 230 (e.g., a server configured by application developer 125 to perform one or more function associated with the application). At 205, the data processing system 120 can provide a content item for an application. The data processing system 120 can provide the content item in response to a request for content for the computing device 110. At 210, the computing device 110 can transmit a request to the data processing system 120 to download the application. At 215, the data processing system 120 can provide the application to the computing device 110. Providing the application can include providing a data file comprising the application executable file or other software module, script, or code for the application. At 220, the computing device 110 can transmit an indication of an in-application event. The in-application event can include, for example, entering a search query in the application, achieving a predetermined score or level, or conducting a transaction in the application. The computing device 110 can be configured to transmit the indication of the in-application event directly to the data processing system 120. In some cases, the computing device 110 can be configured to transmit the indication of the in-application event to a server of the application developer 230, and the server 230 can forward or transmit a ping to the data processing system 120 that indicates the in-application event at 225.

The data processing system 120 can merge the ping data received at 225 with internal data to generated merged data. The data processing system 120 can apply a machine learning technique to the signals of the merged data to identify top ranking signals. The data processing system 120 can identify a number of computing device 110 associated with the top ranking signals to predict a performance of a content campaign configured to select content to provide to computing devices comprising the top ranking signals.

Figure 3:
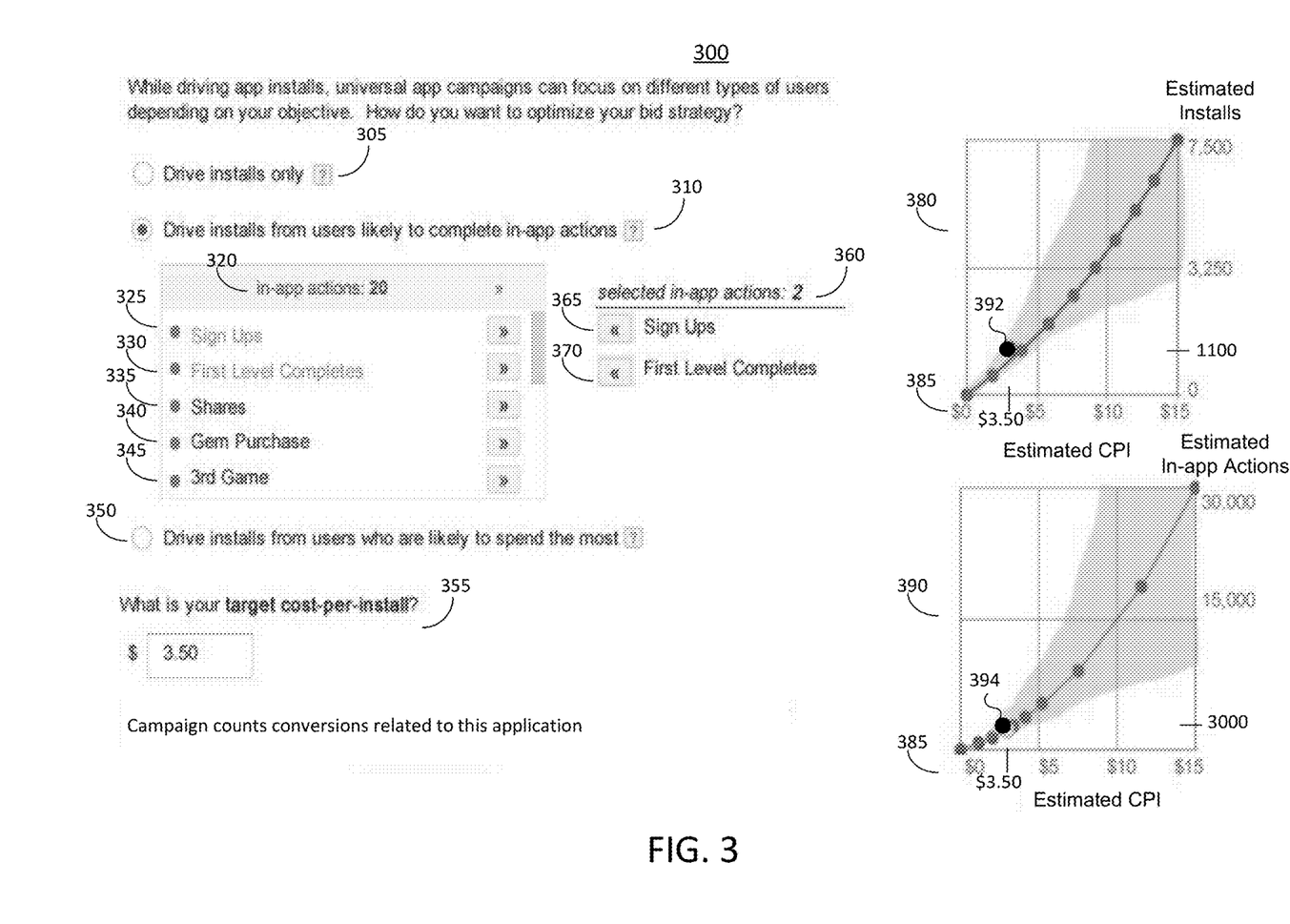
FIG. 3 is a graphical user interface of a system to reduce latency in feedback-based system performance determination in accordance with an implementation.

FIG. 3 is a graphical user interface (GUI) 300 of a system to reduce latency in feedback-based system performance determination in accordance with an implementation. The GUI 300 can be generated or provided by one or more component of system 100, including, e.g., data processing system 120 or landscape generator component 140. The GUI 300 illustrates a landscape chart with an estimated or predicted performance. The GUI 300 can include or refer to the application content delivery profile. The landscape chart can illustrate weekly installations versus a target cost per installation (CPI); weekly in-application action volume versus a target CPI (campaign-level selected conversions); or weekly in-application action net value versus target CPI (campaign-level selected conversions). The GUI 300 can allow the content provider 125 to input one or more values for the application content delivery profile of the content campaign used to select content items or ads for the application.

The GUI 300 can allow the content provider 125 to optimize the content campaign for application installation volume 305 (e.g., the number of installations of the application); installations from computing devices likely to complete in-application actions 310 (e.g., computing devices likely to conduct a transaction in the application); or installations on computing devices with users that are likely to spend the most 350 (e.g., purchase the most flight tickets or most expensive flight tickets). The GUI 300 can further list different types of in-application actions or events, such as sign ups 325, first level completes 330, shares on social media 335, gem purchase 340, third game 345. The content provider 125 can input the in-application actions. The data processing system 120 can automatically determine the types of in application actions based on data associated with the application. For example, the data processing system 120 can obtain metadata for the application that lists the types of in-application events. As illustrated here, the application contains 20 possible in-application actions 320. The content provider 125 can select one or more in-application events 360. As illustrated here, two in-application events are selected: sign ups 365 and first level completes 370. Signs ups 365 can refer to a user of the application signing up for an account to access or use the application, signing up for a subscription to the application, or signing up for other content or services associated with the application. The first level completes in-application action 370 can correspond to completing the first level in a game if the application is a game, or completing a first round of a multi-round process or task.

The data processing system 120 can receive an indication to optimize one or more of 305, 310, or 355. The content provider 125 or application developer 125 can select one or more 305, 310 or 355. If the content provider 125 selects to optimize installs from users likely to complete in-application actions 310, the content provider 125 can further select the desired type of actions 360. Thus, the data processing system 120 can receive, via GUI 300, a type of performance to optimize and a type of in-application event to optimize.

The data processing system 120 can provide an input text box for a target CPI 355. The content provider 125 or application developer 125 can input, via GUI 300, the target CPI. For example, the target CPI can be $3.50. The data processing system 120 can receive the target CPI via GUI 300.

With the received one or more input values (e.g., 310, 360, and 355), the data processing system 120 can generate a predicted performance 380 and 390. The predicted performance 380 comprises a graph having an X-axis with estimated CPI 385, and a Y-axis with estimated installations. As shown in the graph 380, as the estimated CPI increases, the estimated installations also increases. Marker 392 corresponds to a target CPI of 3.50 as input at box 355. Marker 392 indicates that at a target CPI of 3.50, the data processing system 120 predicts or estimates there may be 1100 installations of the applications. The 1100 installations of the applications may be caused by providing content item objects comprising a link or instruction to download the application to at least 1100 computing devices 110.

The data processing system 120 can further estimate a number of in-application actions as shown in chart 390. In chart 390, the x-axis 385 corresponds to Estimated CPI and the Y-axis corresponds to estimated or predicted in-application actions. As shown by marker 394, at a target CPI of 3.50, the data processing system 120 estimates or predicts 3000 in-application actions corresponding to sign ups 365 or first level completes 370. These in-application actions may be attributed to providing content items for the application for display on one or more computing devices. Configuring the application content delivery profile can refer to or include setting the CPI via the input text box 355 or input buttons 310 or 360.

Figure 4:
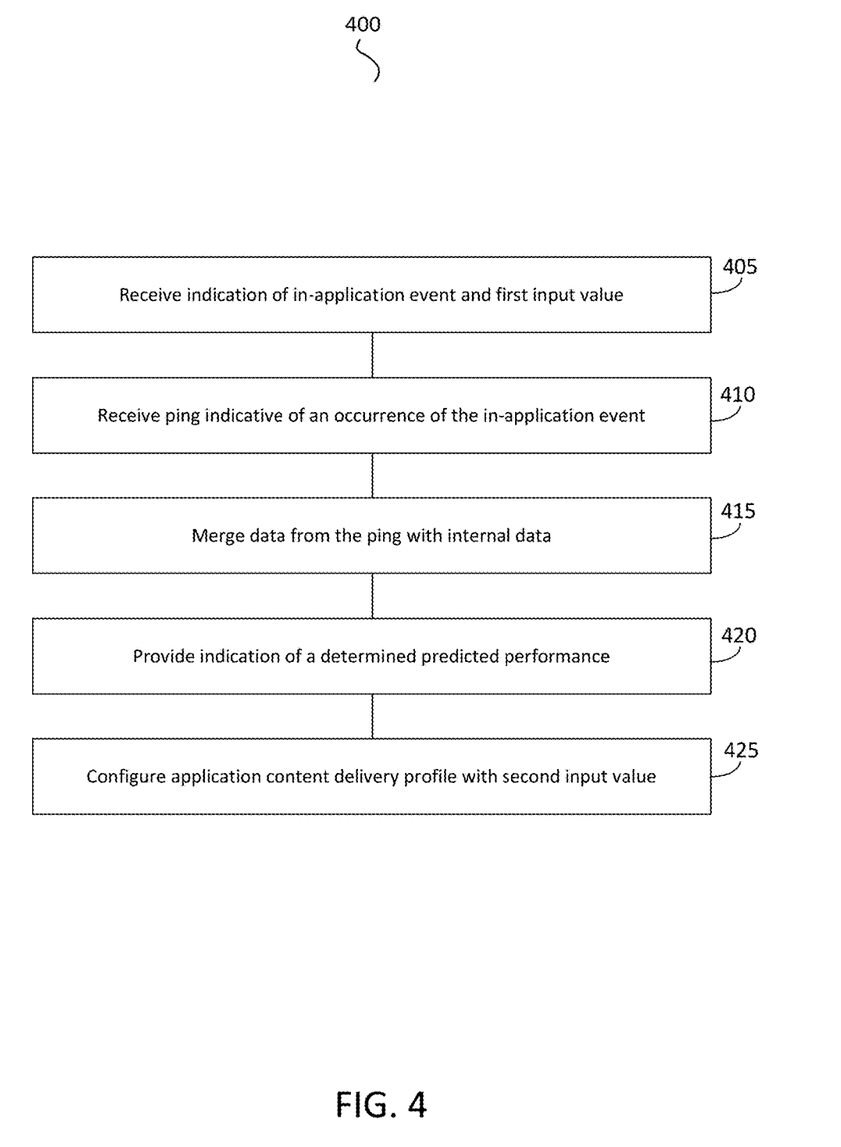
FIG. 4 is an illustration of a method for reducing latency in feedback-based system performance determination in accordance with an implementation.

FIG. 4 is an illustration of a method for reducing latency in feedback-based system performance determination in accordance with an implementation. The method 400 can be performed by one or more component of system 100, such as a data processing system 120. In brief overview, at 405, the data processing system receives an indication of an in-application event and a first input value. At 410, the data processing system receives a ping indicative of an occurrence of the in-application event. At 415, the data processing system merges data from the ping with internal data. At 420, the data processing system provides an indication of a determined predicted performance. At 425, the data processing system configures an application content delivery profile with a second input value.

At 405, the data processing system receives an indication of an in-application event and a first input value. The data processing system can receive the one or more indications from an application developer device or content provider device. The application developer device can correspond to a server or device accessed or used by an application developer or content provider that provides or manages content items for the application developer. The data processing system can receive an indication of an in-application event such as a sign up, first level complete, search query with predetermined terms, sharing content of the application on a social media platform, purchasing content via the application, starting a new game, etc. The data processing system can receive a first input value for the application content delivery profile. The first input value can include, for example, a target cost per installation, optimization parameter (e.g., increase installations, increase installations for users likely to complete in-application actions, increase installations for users likely to spend the most), bid amounts, or budgets.

At 410, the data processing system receives a ping indicative of an occurrence of the in-application event. The data processing system can receive the ping via an interface from an application developed by the application developer and executed by a computing device remote from the data processing system and different from the application developer device. The data processing system can receive the ping from the application developed by the application developer or a similar application. The ping can include ping data that indicates an occurrence of an in-application event or an installation of the application on a computing device.

At 415, the data processing system merges data from the ping with internal data. The data processing system can merge data from the ping with internal data determined by the data processing system to generate a merged data set. Internal data can refer to data stored at the data processing system or otherwise obtained by the data processing system, including, e.g., application information, language, application configuration, etc. Merging the data can refer to associating ping data with the internal data, storing the data in a common format or data structure, using a common identifier for the ping data and the internal data, or otherwise providing or translating the data to a merged data set configured for machine learning.

In some cases, the data processing system can receive ping data from a plurality of applications. The plurality of applications can be developed by the same or different application developers. The plurality of applications can be in a same category as the application, have a same characteristic as the application, or be unrelated to the application.

The data processing system can receive ping data indicating occurrences of one or more in-application events of the plurality of applications. The data processing system can categorize the plurality of applications to identify similar applications and similar in-applications events that correspond to the application and the selected in-application event. The data processing system can merge the similar applications and similar in-applications events with the ping data and internal data to generate the merged data set used for machine learning.

At 420, the data processing system provides an indication of a determined predicted performance. The data processing system can determine, based on the merged data set and the first input value, a predicted performance for the in-application event. The data processing system can provide, via a graphical user interface, an indication of the predicted performance determined based on the merged data set and the first input value. In some cases, the data processing system can determine the predicted performance for the in-application event based on pings and internal data associated with the plurality of similar applications.

At 425, the data processing system configures an application content delivery profile with a second input value. The data processing system can configure, responsive to the indication of the predicted performance, the application content delivery profile with a second input value.

Figure 5:
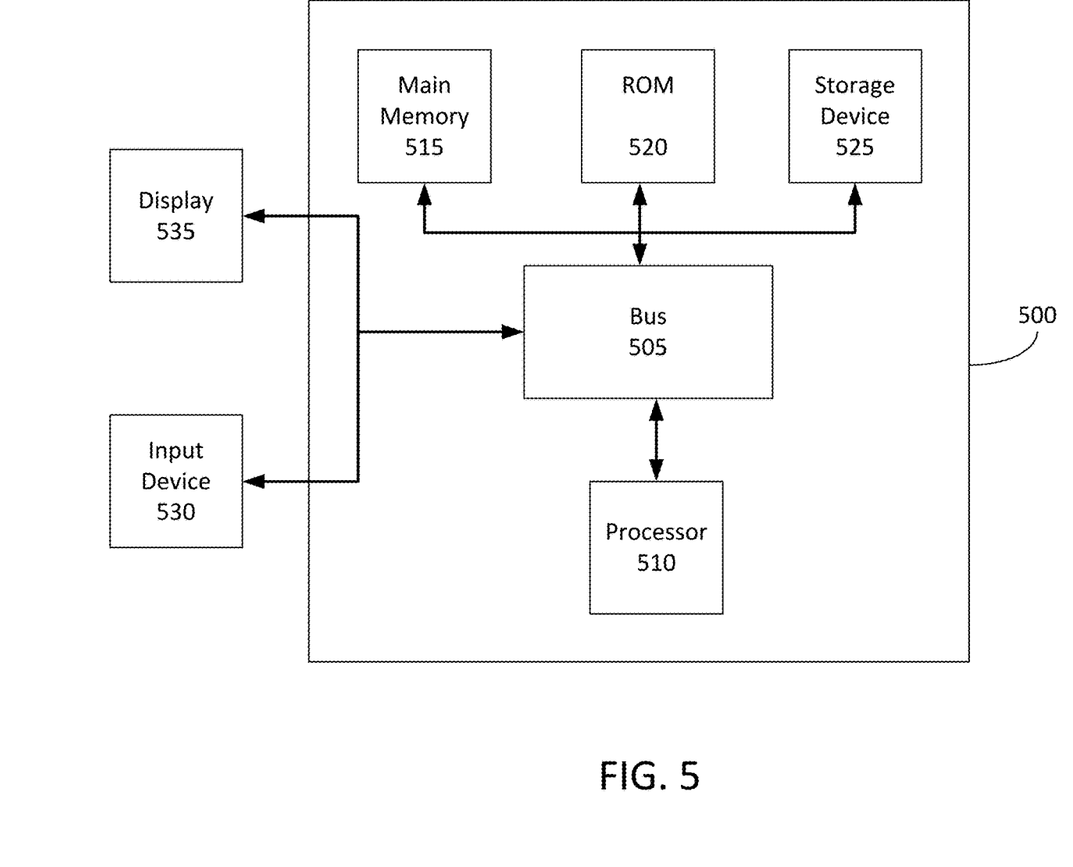
FIG. 5 is a block diagram illustrating a general architecture for a computer system that may be employed to implement various elements of the systems shown in FIGS. 1 and 2, the graphical user interface shown in FIG. 3, and the method shown in FIG. 4 in accordance with an implementation.

FIG. 5 is a block diagram of a computer system 500 in accordance with an illustrative implementation. The computer system or computing device 500 can include or be used to implement the system 100, content provider 125, application developer 125, computing device 110, content publisher 115, online marketplace provider 175, data processing system 120, interface component 130, attribution component 135, landscape generator component 140, content selector component 145, and data repository 150. The computing system 500 includes a bus 505 or other communication component for communicating information and a processor 510 or processing circuit coupled to the bus 505 for processing information. The computing system 500 can also include one or more processors 510 or processing circuits coupled to the bus for processing information. The computing system 500 also includes main memory 515, such as a random access memory (RAM) or other dynamic storage device, coupled to the bus 505 for storing information, and instructions to be executed by the processor 510. The main memory 515 can be or include the data repository 155. The main memory 515 can also be used for storing position information, temporary variables, or other intermediate information during execution of instructions by the processor 510. The computing system 500 may further include a read only memory (ROM) 520 or other static storage device coupled to the bus 505 for storing static information and instructions for the processor 510. A storage device 525, such as a solid state device, magnetic disk or optical disk, is coupled to the bus 505 for persistently storing information and instructions. The storage device 525 can include or be part of the data repository 155.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. The input device 530 can include a touch screen display 535. The input device 530 can also include a cursor control, such as a mouse, a trackball, or cursor direction keys, for communicating direction information and command selections to the processor 510 and for controlling cursor movement on the display 535. The display 535 can be part of the computing device 110 or other component of FIG. 1, for example.

The processes, systems and methods described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to effect illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms. References to at least one of a list of elements can include any of a single element, more than one element, or all elements identified in the list.

Where technical features in the drawings, detailed description or any claim are followed by reference identifiers, the reference identifiers have been included to increase the intelligibility of the drawings, detailed description, or claims. Accordingly, neither the reference identifiers nor their absence have any limiting effect on the scope of any claim elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of reducing latency in feedback-based system performance determination, comprising:

receiving, by a data processing system comprising one or more processor and memory, from an application developer device, an indication of an in-application event and a first input value for an application content delivery profile;

receiving, by the data processing system, via an interface from an application developed by an application developer and executed by a mobile computing device remote from the data processing system and different from the application developer device, an indication of an occurrence of the in-application event on the mobile computing device;

determining, by the data processing system, a number of installations of the application on other mobile computing devices;

generating, by the data processing system, a first merged data set that merges performance signals for the in-application event across the other mobile computing devices on which the application is installed;

identifying, by the data processing system, a plurality of applications that are similar to the application based on at least one characteristic of the application;

generating, by the data processing system, a second merged data set that merges performance signals for in-application events associated with installations of the plurality of applications;

generating, by the data processing system, a regression model that combines the first merged data set with the second merged data set using a machine learning technique;

determining, by the data processing system, using the regression model, a first predicted performance for the in-application event based on the first input value;

calibrating, by the data processing system, the first predicted performance based on a second predicted performance of the plurality of applications to determine a predicted performance;

providing, by the data processing system, via the interface, an indication of the predicted performance determined based on the regression model and the first input value; and configuring, by the data processing system, responsive to the indication of the predicted performance, the application content delivery profile with a second input value, execution by the data processing system of the application content delivery profile configured with the second input value causing the data processing system to select content with an indication to install the application.

2. The method of claim 1, comprising:
receiving, by the data processing system, from a second plurality of applications developed by a plurality of application developers, a plurality of indication of occurrences of one or more in-application events; and merging, by the data processing system, data from the plurality of indications of occurrences with the first merged data set.

3. The method of claim 1, comprising:
configuring, by the data processing system, the application content delivery profile with the second input value greater than the first input value responsive to the predicted performance being less than a threshold.

4. The method of claim 1, comprising:
receiving, by the data processing system, an instruction from the application developer device to configure the application content delivery profile with the second input value, the second input value comprising a same value as the first input value.

5. The method of claim 1, wherein the predicted performance comprises a predicted number of installations for the application.

6. The method of claim 1, comprising:
determining, by the data processing system, the predicted performance for the in-application event based on indications of occurrences of in-application events associated with the plurality of applications.

7. A system to reduce latency in feedback-based system performance determination, comprising:

a data processing system comprising one or more processors and memory to:

receive, from an application developer device, an indications of an in-application event and a first input value for an application content delivery profile;

receive, via an interface from an application developed by an application developer and executed by a mobile computing device remote from the data processing system and different from the application developer device, an indication of an occurrence of the in-application event on the mobile computing device;

determine a number of installations of the application on other mobile computing devices;

generate a first merged data set that merges performance signals for the in-application event across the other mobile computing devices on which the application is installed;

identify a plurality of applications that are similar to the application based on at least one characteristic of the application;

generate a second merged data set that merges performance signals for in-application events associated with installations of the plurality of applications;

generate a regression model that combines the first merged data set with the second merged data set using a machine learning technique;

determine, using the regression model, a first predicted performance for the in-application event based on the first input value;

calibrate the first predicted performance based on a second predicted performance of the plurality of applications to determine a predicted performance;

provide, via the interface, an indication of the predicted performance determined based on the regression model and the first input value; and configure, responsive to the indication of the predicted performance, the application content delivery profile with a second input value, execution by the data processing system of the application content delivery profile configured with the second input value causing the data processing system to select content with an indication to install the application.

8. The system of claim 7, comprising the data processing system to:
receive, from a second plurality of applications developed by a plurality of application developers, a plurality of indications of occurrences of one or more in-application events; and merge data from the plurality of indications of occurrences with the first merged data set.

9. The system of claim 7, comprising the data processing system to:
configure the application content delivery profile with the second input value greater than the first input value responsive to the predicted performance being less than a threshold.

10. The system of claim 7, comprising the data processing system to:
receive an instruction from the application developer device to configure the application content delivery profile with the second input value, the second input value comprising a same value as the first input value.

11. The system of claim 7, wherein the predicted performance comprises a predicted number of installations for the application.

12. The system of claim 7, comprising the data processing system to:
    determine the predicted performance for the in-application event based on indications of occurrences of in-application events associated with the plurality of applications.

13. The system of claim 7, comprising the data processing system to generate the regression model with:
    data received from a first plurality of computing devices that installed the application;
    data received from a second plurality of computing devices that installed, responsive to a content item delivered by the data processing system, one or more applications different from the application, the one or more applications matching a characteristic of the application; and
    data received from a third plurality of computing devices that installed, responsive to an organic search, the one or more applications different from the application, the one or more applications matching the characteristic of the application.

14. The system of claim 7, comprising the data processing system to:
    provide a software development kit to the application developer device that configured the application to transmit an indication to the data processing system responsive to the occurrence of the in-application event.

15. The system of claim 7, comprising the data processing system to:
    determine at least one of a type of application or a configuration of an installation of the application;
    the data from the indication of the in-application event comprises at least one of a level of the application, a score of the application, or a query input into the application.

\* \* \* \* \*